(12) United States Patent
Rowland et al.

(10) Patent No.: US 6,364,337 B1
(45) Date of Patent: Apr. 2, 2002

(54) PIVOTING TRAILER HITCH ADAPTER SYSTEM

(76) Inventors: Edward R. Rowland; Thomas W. Hunsucker, both of 5490 Via Ricardo, Riverside, CA (US) 91739

( * ) Notice: Subject to any disclaimer, the term of this patent is extended or adjusted under 35 U.S.C. 154(b) by 0 days.

(21) Appl. No.: 09/715,386

(22) Filed: Nov. 17, 2000

Related U.S. Application Data

(60) Provisional application No. 60/167,190, filed on Nov. 23, 1999.

(51) Int. Cl.[7] .............................................. B60D 1/155
(52) U.S. Cl. ................................. 280/491.3; 280/479.2
(58) Field of Search .......................... 280/414.1, 414.2, 280/414.3, 491.3, 491.5, 491.1, 479.2

(56) References Cited

U.S. PATENT DOCUMENTS

| | | | | |
|---|---|---|---|---|
| 4,398,742 A | * | 8/1983 | Sanders | 280/491.3 |
| 5,308,100 A | * | 5/1994 | Heider et al. | 280/474 |
| 5,503,423 A | * | 4/1996 | Roberts et al. | 280/479.2 |
| 5,890,617 A | * | 4/1999 | Rowland et al. | 280/491.3 |
| 5,992,871 A | * | 11/1999 | Rowland et al. | 280/491.3 |

FOREIGN PATENT DOCUMENTS

| | | | | |
|---|---|---|---|---|
| DE | 1265590 | * | 4/1968 | 280/491.3 |
| IT | 549077 | * | 12/1987 | 280/491.3 |

* cited by examiner

*Primary Examiner*—Anne Marie Boehler

(57) ABSTRACT

Disclosed is a trailer hitch adapter system that may be used to convert a standard trailer into a trailer having a pivoting hitch tongue. The system preferably comprises a hitch tongue that is movable between two positions: an out-of-the-way storage position and a towing position. When in the towing position, the hitch tongue does not increase the overall length of the trailer. When the hitch tongue is in the towing position, the tongue can be attached to the hitch of a towing vehicle so that the trailer may be towed.

5 Claims, 4 Drawing Sheets

PIVOTING TRAILER HITCH ADAPTER SYSTEM

REFERENCE TO RELATED APPLICATIONS

This application claims the benefit of U.S. Provisional application Ser. No. 60/167,190, entitled "Pivoting Trailer Hitch System", filed Nov. 23, 1999.

BACKGROUND OF THE INVENTION

1. Field of the Invention

The present invention relates generally to trailer systems and, more particularly, to systems for attaching trailers to vehicles.

2. Description of Related Art

For towing purposes, boat trailers by nature are longer than the boats that they carry. Because of this requirement, storing certain sized boats and their trailers in a confined space, such as a typical homeowner's garage, becomes difficult if not impossible. This storage constraint forces some people to buy smaller boats.

On the other hand, many boaters have a near fanatical devotion to their sport and refuse to sacrifice the size of the boat in order to accommodate a small storage space. Consequently, some boaters have to resort to expensive and time consuming measures in order to store a boat of a desired size. For example, some boaters have been known to enlarge the sizes of their garage spaces in order to create sufficient room to store boats indoors.

Some boaters may purchase specialized boat trailers where the front of the trailer, specifically the tongue area, can be adjusted in size to fit within small areas. There currently exist trailers with hinged mounting tongues that swing out of the way when not in use. The tongue therefore does not unnecessarily increase the overall length of the trailer when the trailer is in storage. Such a device is described in U.S. Pat. No. 5,890,617 to Rowland et al. Unfortunately, a boat owner is currently required to purchase an entire boat trailer in order to take advantage of such a device. This could be very expensive.

It would be highly desirable for an owner of a boat trailer to be able to convert an existing trailer into an adjustable size trailer. Preferably, it would not require a welder to convert the trailer, thereby eliminating the need for undesirable time-consuming welding and painting processes for existing trailers.

SUMMARY OF THE INVENTION

Disclosed is a trailer hitch adapter system that may be used to convert a standard trailer into a trailer having a pivoting hitch tongue. The system preferably comprises a hitch tongue that is movable between two positions: an out-of-the-way storage position and a towing position. When in the towing position, the hitch tongue does not increase the overall length of the trailer. When the hitch tongue is in the towing position, the tongue can be attached to the hitch of a towing vehicle so that the trailer may be towed.

The system preferably includes an adapter member that allows the pivoting hitch tongue to be attached to virtually any trailer. In one embodiment, the adapter member comprises a sleeve that is configured to mate with a tongue of the trailer. The adapter member is preferably secured to the trailer tongue using bolts. Advantageously, the adapter member allows a user to quickly convert any trailer into a trailer having a pivoting hitch.

Still further objects and advantages attached to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

DETAILED DESCRIPTION OF THE INVENTION

Throughout this description, the preferred embodiment and examples shown should be considered as exemplars, rather than limitations on the apparatus and methods of the present invention.

Figure 1:
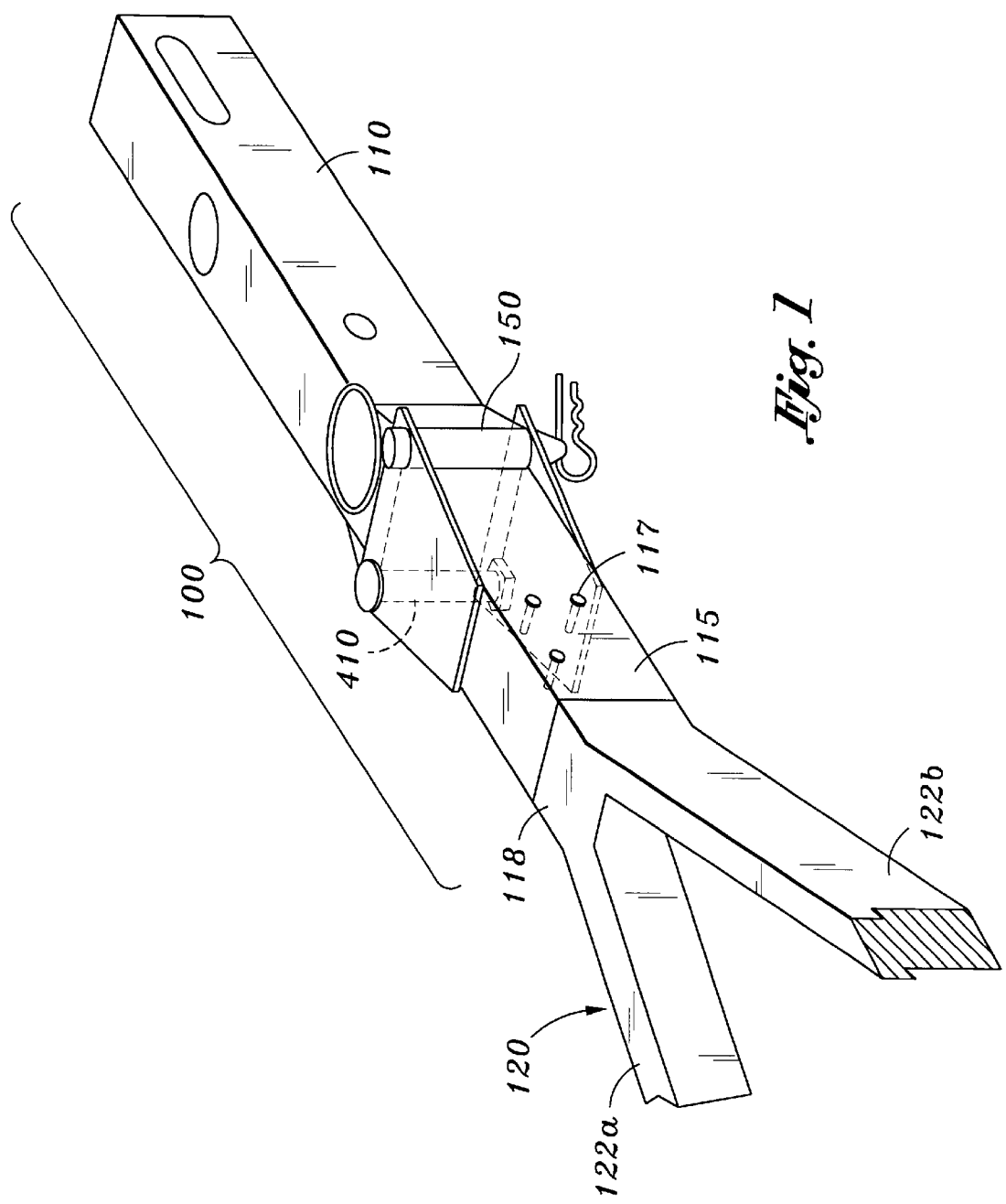
FIG. 1 is a front perspective view of the disclosed hitch system.

FIG. 1 shows perspective view of a trailer hitch adapter system 100 comprised of a pivoting hitch tongue 110 and an adapter member 115. The hitch adapter system 100 attaches to the front section 118 of a trailer 120, such as in a male-female mating relationship. The trailer 120 may be constructed in a "A" shape configuration wherein a pair of side support arms 122a, 122b connect at an apex to the front section 118. The front section 118 typically comprises an elongate towing arm that extends outwardly from the trailer. The trailer may be pulled or towed by the elongate arm. FIG. 1 shows only a partial view of the trailer 120. The trailer 120 preferably comprises a boat trailer that is configured to support a boat, although the trailer 120 could also comprise any type of trailer. The trailer 120 and front section 118 may be hollow or solid.

Figure 2:
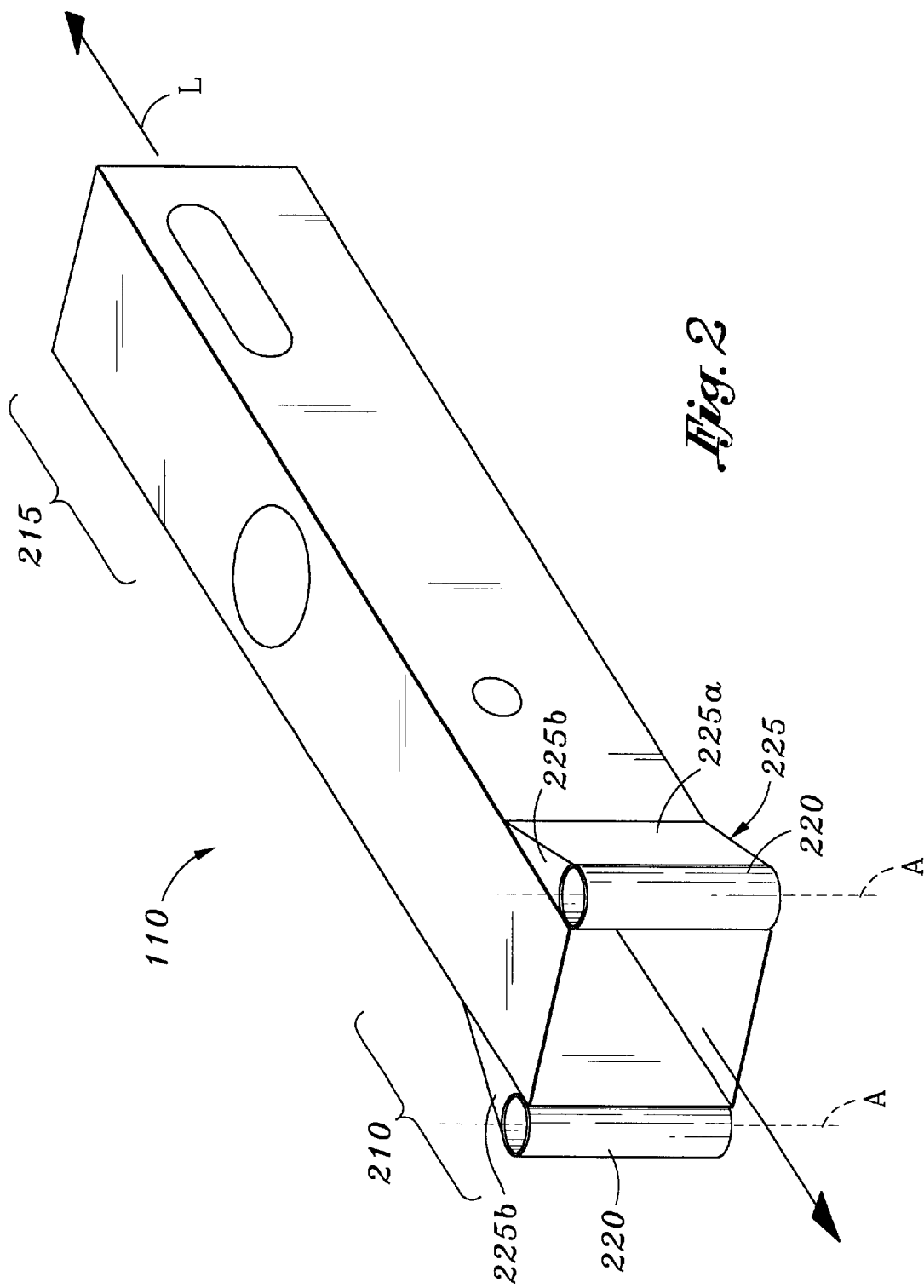
FIG. 2 is a front perspective view of a hitch tongue.

FIG. 2 is a front perspective view of the hitch tongue 110 that comprises an elongate arm having a front region 210 and a rear region 215. In one embodiment, the hitch tongue 110 comprises an actuator cover of the type that are known to those skilled in the art. In such an embodiment, the actuator cover typically has holes 211 (shown in phantom). In another embodiment, the hitch tongue does not include an actuator cover. The hitch tongue 110 preferably has a rectangular cross-sectional shape and is preferably at least partially hollow. The hitch tongue 110 is configured to be attached to a tow vehicle (not shown) in a well known manner. The hitch tongue generally extends along a longitudinal axis L.

A hollow tube 220 is located on the front region 210 of the hitch tongue 110. Preferably, the tubes 220 are located on opposite sides of the longitudinal axis. The hollow tubes 220 are preferably cylindrical in shape and are preferably fixedly attached to the hitch tongue 110, such as through a weld connection. Each tube 220 is aligned along an axis A that extends along the central axis of the tubular sleeves.

A gusset 225 is attached to each of the tubes 220 and to the sides of the hitch tongue 110, such as through a weld connection. The gussets 225 preferably reinforce the connection between the tubes 220 and the sides hitch tongue 110 to thereby reduce the likelihood that the tubes 220 will detach from the hitch tongue 110. In a preferred embodiment, each gusset 225 comprises a one or more pieces of metal that are formed to fit smoothly between the respective tube 220 and the hitch tongue 110. The gussets 225 are preferably formed to match the dimensions and shape of the tubes 220. For example, side gussets 225a are rectangular in shape and connect the sides of the tubes 220 to the hitch tongue 110. A set of top and/or bottom gussets 225b connect the top and bottom, respectively, of the tubes 220 to the hitch tongue 110. The top/bottom gussets 225b preferably seal any gaps that are formed between the side gussets 225a, the tubes 220, and the hitch tongue 110.

Figure 3:
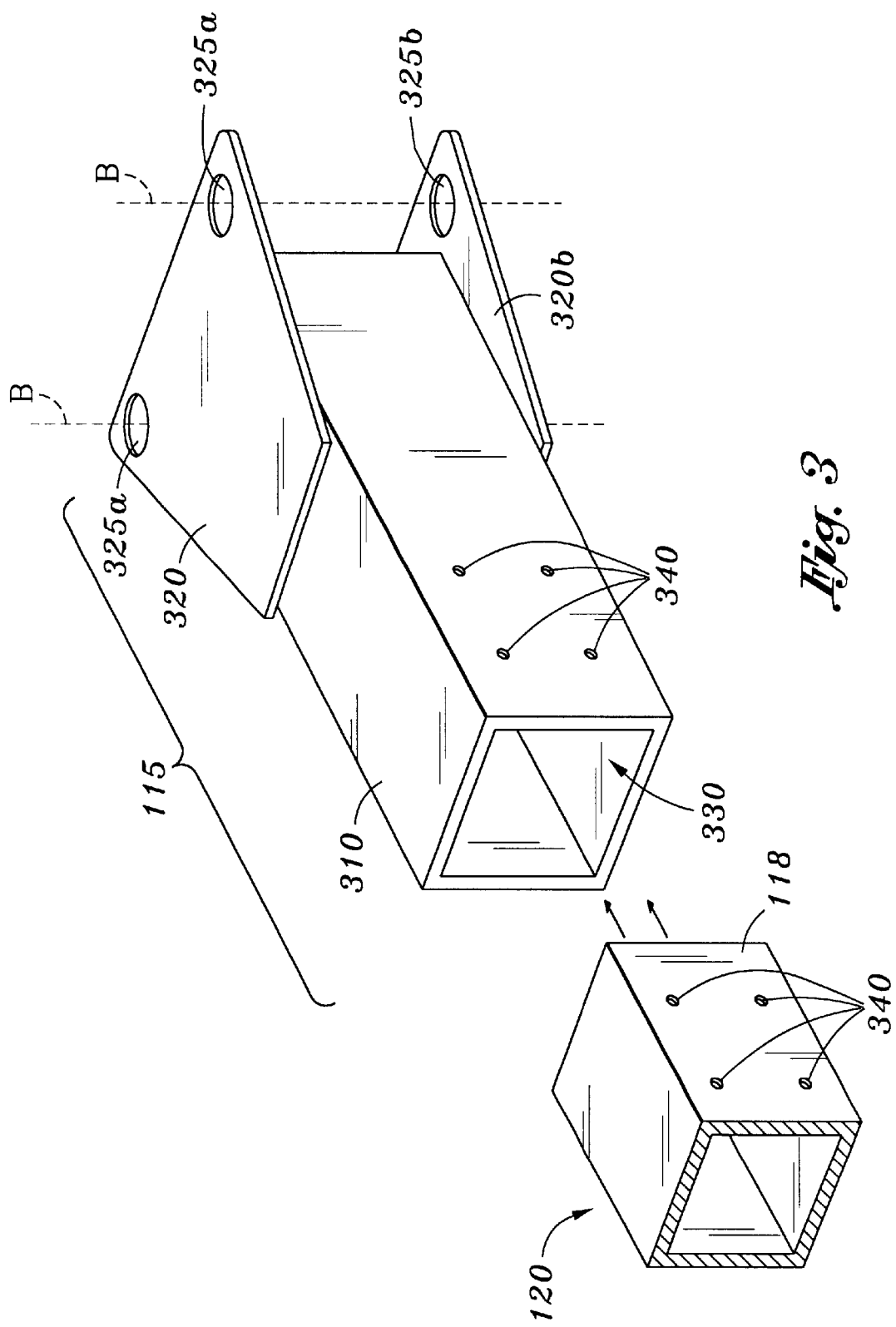
FIG. 3 is a front perspective view of an adapter arm.

With reference to FIG. 3, there is shown an exploded view of the adapter member 115 and a portion of the front section 118 of the trailer 120. The adapter member 115 comprises an elongate adapter sleeve 310, an upper support plate 320a and a lower support plate 320b. The adapter sleeve 310 is sandwiched between the support plates 320. In the illustrated embodiment, the support plates 320 are trapezoidal in shape and are manufactured of a rigid material. The support plates 320 are preferably fixedly attached to the adapter sleeve 310, such as through a weld.

An upper hole 325a is located at each outer corner of the upper support plate 320a. Likewise, a lower hole 325b is located at each outer corner of the lower support plate 320b. Each upper hole 325a is preferably axially aligned with a corresponding lower hole 325 along a respective axis B. The trapezoidal shape of the support plates 325 allows the holes 325 to located at a wider location that the width of the adapter sleeve 310. In other words, the axes b of the holes 325 preferably does not intersect any portion of the adapter sleeve 310.

The corners of the support plates 320 at which the holes 325 are located are preferably rounded for safety. Preferably, the radius of the rounded corners matches the radius of the holes 325.

The adapter sleeve 310 preferably defines a hollow interior that is sized to receive the front section 118 of the trailer 120. An attachment end of the adapter sleeve 310 preferably defines an opening 330 that is sized to receive the trailer front section 118. Preferably, the opening 330 has a shape that matches the cross-sectional shape of the front section 120 so that the front section 120 may be slid into the adapter sleeve 310 and mated thereto. The shape of the opening 330 may exactly match the shape of the front section 118 for a more secure fit; alternatively, the shape of the opening 330 and the front section 118 may vary from one another. In one embodiment, the trailer front section 120 mates with the adapter sleeve 310 in a press fit that provides a secure attachment between the trailer 120 and the adapter member 115 without the need for additional attachment devices. In a preferred embodiment, the adapter sleeve 310 and trailer front section 118 include mounting holes 340 that may be aligned and secured using attaching devices such as bolts 117. A weld may also be used to secure the trailer 120 to the adapter member 115.

Figure 4:
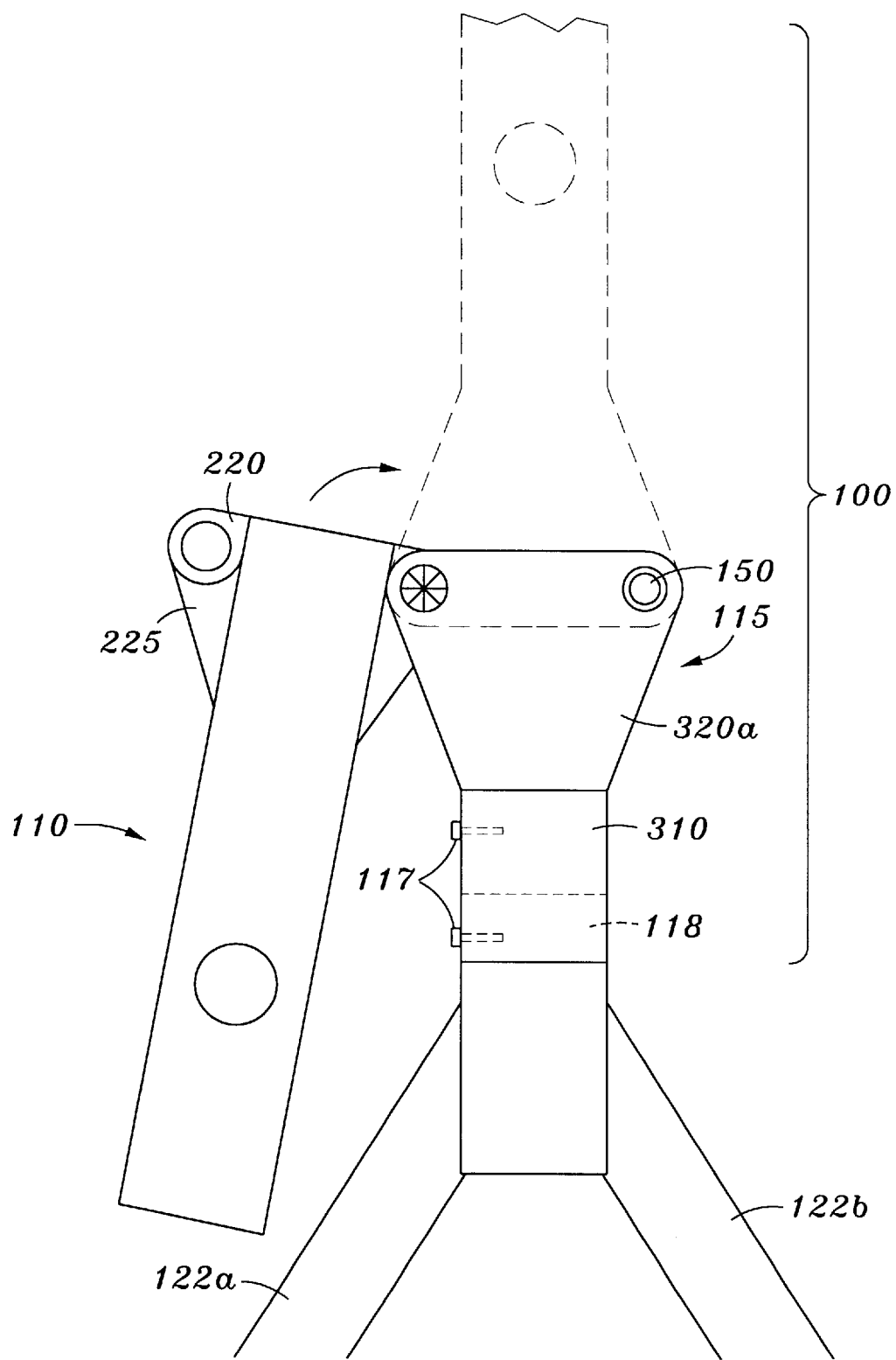
FIG. 4 is a top planar view of the hitch system.

FIGS. 1 and 4 show an assembled hitch adapter system 100. The tubular tubes 220 of the hitch tongue 110 are aligned with the holes 325 of the adapter member 115 so that the axes A (FIG. 2) align with the axes B (FIG. 3). A pivot pin 410 is attached to the plates 320 of the adapter member 115. The pivot pin is also located within one of the tubes 220 of the hitch tongue 110 to thereby provide a rotational attachment between the hitch tongue 110 and the adapter member 115. A washer could be provided between the tubes 220 and the plates 320 so that the tubes 220 do not scrape against the plates 320 during rotation. The hitch tongue 110 is rotatable between two positions: a storage position and a towing position, as described more fully below.

With reference to FIGS. 1 and 4, the functionality of the hitch adapter system 100 is now described. The trailer 120 is first fixedly coupled to the adapter member 115. As discussed above with respect to FIG. 3, this is accomplished by inserting the trailer front section 118 into the adapter sleeve 310 of the adapter member. Advantageously, the adapter system 100 could be used with any trailer, new or old, by simply using an adapter sleeve 310 that is tailored to mate with the front section of the particular trailer.

As best shown in FIG. 4, the hitch tongue 110 is rotatably movable between a storage position (shown in solid lines) and a towing position (shown in phantom lines). In the storage position, the pivot pin 410 is the only attachment between the hitch tongue 110 and the adapter member 115. Advantageously, when in the storage position, the hitch tongue 110 does not increase or contribute to the overall length of the trailer 120. Rather, the hitch tongue 110 is in an out-of-the-way location when in the storage position.

With reference still to FIG. 4, the hitch tongue 110 is moved to the towing position by rotating the hitch tongue about the pivot pin 410, with the axis of the pivot pin 410 being the axis of rotation. The hitch tongue 110 is preferably rotated so that the length of the hitch tongue 110 is in line with the length of the sleeve 310 of the adapter member, as shown in phantom lines of FIG. 4. A coupling pin 150 (FIGS. 1 and 4) is then inserted into the remaining open hole 325 and tube 220 combination. The coupling pin 150 is used to secure the hitch tongue 110 in the towing position.

When the hitch tongue 110 is in the towing position, the hitch tongue 110 is coupled to a towing vehicle in a well known manner. The trailer 120 may then be towed with the hitch adapter system 100 acting as the attachment between the towing vehicle and the trailer 120. Advantageously, the adapter system 100 can be used to convert any trailer 120 into a trailer having a pivoting hitch without requiring welds or a time-consuming paint process.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed:

1. A device for attaching a pivoting hitch tongue to a boat trailer, wherein the trailer has an elongate front arm that is used to tow the trailer, the adapter comprising:

a. a hitch tongue that is attachable to a towing vehicle, the hitch tongue comprising:

i. an elongate arm that is adapted to be secured to the towing vehicle, the hitch tongue extending along a longitudinal axis;

ii. a first tube attached to a first end of the hitch tongue to form an attachment therebetween, the first tube located on a first side of the longitudinal axis;

iii. a second tube attached to the first end of the hitch tongue to form an attachment therebetween, the second tube located on a side of the longitudinal axis which is opposite the first side;

iv. one or more gussets that are connected to the first and second tubes and to the hitch tongue, wherein welds are used to secure the gussets to the first and second tubes and the hitch tongue and wherein the gussets reinforce the attachments between the first and second tubes and the hitch tongue;

b. an adapter member that is configured to be attached to the elongate front arm of the trailer, the adapter member being pivotably attached to the hitch tongue, the adapter member comprising:

i. an adapter sleeve having a first end and a second end, wherein the first end of the adapter sleeve includes an opening that is sized to receive therein the elongate front arm of the trailer;

ii. an upper plate attached to an upper side of the second end of the adapter sleeve, the upper plate including an upper hole that is coaxially aligned with the first tube of the hitch tongue;

iii. a lower plate attached to a lower side of the second end of the adapter sleeve, the lower plate including a lower hole that is coaxially aligned with the first tube of the hitch tongue, wherein a pivot pin is located within the first tube, the pivot pin extending through the upper and lower holes and providing a pivot axis for pivoting the hitch tongue with respect to the adapter member;

wherein the hitch tongue is pivotable about the pivot pin such that the hitch tongue is movable to a storage position and to a towing position.

2. The device of claim 1, wherein the elongate front arm of the trailer has a cross-sectional shape and wherein the opening in the adapter sleeve has a shape that matches the cross-sectional shape of the elongate front arm.

3. The device of claim 1, wherein the hitch tongue may be locked in the towing position.

4. The device of claim 3, wherein the second tube is configured to receive a locking pin when the hitch tongue is in the towing position, and wherein the locking pin prevents the hitch tongue from being pivoted out of the towing position.

5. The device of claim 1, wherein the adapter sleeve includes mounting holes that are sized to receive attaching devices for securing the front arm of the trailer to the adapter sleeve when the front arm of the trailer is inserted in the opening of the adapter sleeve.

* * * * *